United States Patent [19]
Ikenaga et al.

[11] Patent Number: 4,719,171
[45] Date of Patent: Jan. 12, 1988

[54] OPTICAL DISC

[75] Inventors: Yukio Ikenaga; Katsuhiko Takahashi, both of Fuji; Tsuneyoshi Okada, Kawasaki; Kenji Hijikata; Toshio Kanoe, both of Fuji, all of Japan

[73] Assignee: Polyplastics Co., Inc., Japan

[21] Appl. No.: 31,215

[22] Filed: Mar. 30, 1987

Related U.S. Application Data

[63] Continuation of Ser. No. 784,271, Oct. 4, 1985, abandoned.

[30] Foreign Application Priority Data

Oct. 9, 1984 [JP] Japan ................................ 59-210585

[51] Int. Cl.$^4$ ................................................ G11B 7/24
[52] U.S. Cl. ...................................... 430/271; 428/65; 430/945
[58] Field of Search ..................... 428/64, 65; 430/271, 430/945; 369/384, 386, 388

[56] References Cited

U.S. PATENT DOCUMENTS

| 4,188,433 | 2/1980 | Dijkstra et al. | 428/463 X |
| 4,405,671 | 9/1983 | Ozawa et al. | 428/522 X |
| 4,465,767 | 8/1984 | Oba et al. | 430/271 |

Primary Examiner—Alexander S. Thomas
Attorney, Agent, or Firm—Burns, Doane, Swecker & Mathis

[57] ABSTRACT

An optical disc comprises a substrate formed from a polymer being capable of the anisotropic melt phase and being melt-processable, a recording layer having pits and grooves, formed on the substrate, and a metal coating layer, formed on the recording layer.

22 Claims, 2 Drawing Figures

OPTICAL DISC

This application is a continuation of application Ser. No. 784,271, filed Oct. 4, 1985, now abandoned.

The invention relates to an optical disc or photo-disc and in particular an optical disc having a high accuracy in shape and dimension of pits and grooves and an excellent stability of dimension of the substrate. The disc is formed from a polymer adapted to form the anisotropic melt phase. The polymer is melt-processable in the way of material.

STATEMENT OF PRIOR ARTS

As data recording and reproducing discs of a type adapted to reproduce data by irradiating laser beams from one surface of the disc, with a recording layer (hereinafter called data pits) comprising pits and grooves formed on this disc surface and a metal coating layer formed on its exposed side, video- and audio-discs, etc., have been developed and recently have attained rapid progress. As disc materials of this type, hard vinyl chloride series resins, polycarbonate series resins, polymethyl methacrylate series resins, etc., are being studied. Such well-known photo-disc materials have following defects:

Thus the hard vinyl chloride series resins are inferior in formability and show defects due to the addition of a wide variety of compounding agents. For example, they involve a problem of plasticizer, etc., for improving their formability bleeding to the disc surface, resulting in reduced accuracy in reproduction.

The polycarbonate series resins, although being excellent in heat resistance, impact resistance, etc., have difficulty in formability; thus, it is difficult to exactly reproduce the fine undulations formed on the stamper for embossing the data pits on the substrate, also resulting in insufficient sensitivity and accuracy.

In contrast, the polymethyl methacrylate series polymers are excellent in transparency and non-optical rotation, but involves problems of lack of moisture resistance and low dimensional stability under ambient circumstances involving moisture and heat, etc. Morever, these resins are susceptible to cracking, being low in mechanical strength, particularly, shock resistance, and their hardness posing problems in formability.

The present inventors, paying attention to such circumstances, have arrived at this invention as a result of making studies for finding out optimum resins as substrate materials for photo-discs including photo-video-discs, photo-audio-discs, etc., of a type for exclusive use in reproduction and particularly, pursuing assiduous studies to obtain a photo-disc capable of fulfilling the required characteristics of being higher in accuracy in shape and dimensions of pits and grooves in its substrate and more excellent in dimensional stability than the aforementioned well-known resins.

An optical disc according to the invention comprises a substrate formed from a polymer being capable of the anisotropic melt phase and being melt-processable, a recording layer having pits and grooves, formed on the substrate, and a metal coating layer, formed on the recording layer. It preferably comprises a light-transmitting, surface-protecting layer on the metal coating layer. In a practical embodiment of the optical disk, the recording layer has been placed only on one side of the substrate or on each side of the substrate. Another practical embodiment of the optical disc may be obtained by assembling two optical discs as defined above and attaching them to each other on the rear surfaces of the substrates.

According to the invention, the substrate is formed from the polymer and comprises the polymer which is in the anisotropic phase. In addition, the substrate may be formed from a polymer composition which comprises the polymer and another polymer.

Thus in constructing the photo-disc of this invention, while on one surface of a substrate formed of a polymer composition adapted to form anisotropic melt phase and which is melt-processable, a recording layer comprising pits and grooves is formed, on the surface of said recording layer, a metal coating layer which comprises a reflecting surface is formed; then, into this disc, no irradiation of laser beams is made from the substrate side, but reproduction of data is made possible by irradiating laser beams on the reflecting surface of the aforementioned metal coating from opposite side to the substrate.

The resins for forming the substrate of the photo-disc of this invention are polymer compositions which show optical anisotropy, when melted, and which are thermoplastic and melt-processable; such polymers are generally classified as thermotropic liquid crystal polymers.

Polymers adapted to form such anisotropic melt phase have a property that in their molten state, polymer molecule chains show regular parallel arrangement. The state in which molecules are arranged in this fashion is often called liquid crystal state or nematic phase of liquid crystalline material. Such polymers are generally slender, flat and fairly high in rigidity along longer axis of molecule and are normally manufactured from monomers having a plurality of chain extended bonds being either in coaxial or parallel relation to each other.

The property of the anisotropic melt phase may be checked for sure by the commonly used method of polarization inspection based on utilization of orthogonal polarizers. More particularly, the confirmation of the anisotropic melt phase may be made by observing a sample put on a Leitz hot stage at a magnification of 40 in nitrogen atmosphere, using a Leitz polarization microscope. The aforementioned polymers are optically anisotropic. Thus they permit light to pass through, when checked between orthogonal polarizers. If a sample is optically anisotropic, a polarized light will pass through it, even if it is in stationary state.

Mentioned as the components of the polymers adapted to form anisotropic melt phase such as the aforementioned are:

1. Those comprising one or more of aromatic dicarboxylic acids and alicyclic dicarboxylic acids;
2. Those comprising one or more of aromatic diols, alicyclic diols and aliphatic diols;
3. Those comprising one or more of aromatic hydroxycarboxylic acids;
4. Those comprising one or more of aromatic thiol carboxylic acids;
5. Those comprising one or more of aromatic dithiols and aromatic thiol phenols; and
6. Those comprising one or more of aromatic hydroxyamines and aromatic diamines.

Thus, the polymers adapted to form anisotropic melt phase are composed of the following combinations:

(I) Polyesters formed of 1 and 2 ;
(II) Polyesters formed of 3 only;
(III) Polyesters formed of 1 , 2 and 3 ;

(IV) Polythiol esters formed of 4 only;
(V) Polythiol esters formed of 1 and 5;
(VI) Polythiol esters formed of 1, 4 and 5;
(VII) Polyester amides formed of 1, 3 and 6; and
(VIII) Polyester amides formed of 1, 2, 3 and 6.

Although not included in the categories of combinations of components above-mentioned, aromatic polyazomethines are included as polymers adapted to form anisotropic fused phase. Mensioned as particular examples of such polymers are: Poly(nitrilo-2-methyl-1,4-phenylenenitriloethylidene-1,4-phenylene ethylidene), poly(nitrolo-2-methyl-1,4-phenylene nitroloethylidene-1,4-phenylene methylidene) and poly(nitrilo-2-chloro-1,4-phenylene nitrilomethylidene-1,4-phenylene methylidene).

Further, although not included in the categories of the combinations of the aforementioned components, polyester carbonates are included as the polymers adapted to form anisotropic fused phase. Some of them essentially comprise 4-oxybenzoyl units, dioxyphenyl units, dioxycarbonyl units and terephthaloyl units.

In the following, such compounds which are usuable as components of (I)–(VIII) above-mentioned are listed hereunder:

Mentioned as aromatic dicarboxylic acids are: Aromatic dicarboxylic acids such as terephthalic acid, 4,4'-diphenyl dicarboxylic acid, 4,4'-triphenyl dicarboxylic acid, 2,6-naphthalene dicarboxylic acid, diphenyl ether-4,4'-dicarboxylic acid, diphenoxyethane-4,4'-dicarboxylic acid, diphenoxybutane-4,4'-dicarboxylic acid, diphenyl ethane-4,4'-dicarboxylic acid, isophthalic acid, diphenyl ether-3,3'-dicarboxylic acid, diphenoxyethane-3,3'-dicarboxylic acid, diphenyl ethane-3,3'-dicarboxylic acid and naphthalene-1,6-dicarboxylic acid or alkyl, alkoxyl or halogen substitutes of the aforementioned aromatic dicarboxylic acids such as chloroterephthalic acid, dichloroterephthalic acid, bromoterephthalic acid, methyl terephthalic acid, dimethyl terephthalic acid, ethyl terephthalic acid, methoxyterephthalic acid and ethoxyterephthalic acid.

Mentioned as the alicyclic dicarboxylic acids are: Alicyclic dicarboxylic acids such as trans-1,4-cyclohexane dicarboxylic acid, cis-1,4-cyclohexane dicarboxylic acid, 1,3-cyclohexane dicarboxylic acid, etc., or alkyl, alkoxyl or halogen substitutes of the aforementioned alicyclic dicarboxylic acids such as trans-1,4-(1-methyl)-cyclohexanedicarboxylic acid, trans-1,4-(1-chloro)-cyclohexane dicarboxylic acid, etc.

Mentioned as aromatic diols are: Aromatic diols such as hydroquinone, resorcinol, 4,4'-dioxydiphenyl, 4,4'-dioxytriphenyl, 2,6-naphthalenediol, 4,4'-dioxydiphenyl ether, bis(4-oxyphenoxy)-ethane, 3,3'-dioxydiphenyl, 3,3'-dioxydiphenyl ether, 1,6-naphthalene diol, 2,2-bis(4-hydroxyphenyl) propane, 2,2-bis(4-hydroxyphenyl) methane, etc., or alkyl, alkoxy or halogen substitutes of the aforementioned aromatic diols such as chlorohydroquinone, methyl hydroquinone, 1-butyl hydroquinone, phenyl hydroquinone, methoxyhydroquinone, phenoxyhydroquinone, 4-chlororesorcinol, 4-methyl resorcinol, etc.

Mentioned as the alicyclic diols are: Alicyclic diols such as trans-1,4-cyclohexanediol, cis-1,4-cyclohexanediol, trans-1,4-cyclohexane dimethanol, cis-1,4-cyclohexane dimethanol, trans-1,3-cyclohexanediol, cis-1,2-cyclohexanediol and trans-1,3-cyclohexanedimethanol or alkyl, alkoxyl or halogen substitutes of the aforementioned alicyclic diols such as trans-1,4-(1-methyl)cyclohexanediol and trans-1,4-(1-chloro) cyclohexanediol.

Mentioned as the aliphatic diols are: Straight chain or branched aliphatic diols such as ethylene glycol, 1,3-propanediol, 1,4-butanediol, neopentyl glycol, etc.

Mentioned as the aromatic hydroxycarboxylic acids are: Aromatic hydroxycarboxylic acids such as 4-hydroxybenzoic acid, 3-hydroxybenzoic acid, 6-hydroxy-2-naphthoic acid, 6-hydroxy-1-naphthoic acid, etc., or alkyl, alkoxyl or halogen substitutes of aromatic hydroxycarboxylic acids such as 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methyl-2-naphthoic acid, 3-chloro-4-hydroxybenzoic acid, 2-chloro-4-hydroxybenzoic acid, 2,3-dichloro-4-hydroxy-benzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, 6-hydroxy-5,7-dichloro-2-naphthoic acid, etc.

Mentioned as the aromatic mercaptocarboxilic acids are: 4-Mercaptobenzoic acid, 3-mercaptobenzoic acid, 6-mercapto-2-naphthoic acid, 7-mercapto-2-naphthoic acid, etc.

Mentioned as the aromatic dithiols are: Benzene-1,4-dithiol, benzene-1,3-dithiol, 2,6-naphthalene dithiol and 2,7-naphthalene dithiols, etc.

Mentioned as the aromatic mercaptophenols are: 4-Mercaptophenol, 3-mercaptophenol, 6-mercaptophenol and 7-mercaptophenol, etc.

Mentioned as aromatic hydroxyamines and aromatic diamines are: 4-Aminophenol, 4-N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenyl methane, 4-amino-4'-hydroxydiphenyl sulfide, 4,4'-diaminophenyl sulfide (thiodianiline), 4,4'-diaminophenyl-sulfone, 2,5-diaminotoluene, 4,4'-ethylene dianiline, 4,4'-diaminodiphenoxyethane, 4,4'-diaminodiphenyl methane(methylene dianiline), 4,4'-diaminodiphenyl ether (oxydianiline), etc.

Of the aforementioned polymers (I)–(VIII) composed of the aforementioned components, there exist those which are adapted to form anisotropic fused phase and those which are not, depending on their components, their composition ratios and sequence distributions in these polymers. The polymers used in accordance with this invention are restricted to those of the aforementioned polymers adapted to form anisotropic fused phase.

The polyesters of the aforementioned (I), (II) and (III) and polyester amides of (VIII), being polymers adapted to form anisotropic fused phase which are desirable for use in exercising this invention, may be produced by various ester forming methods which enable mutual reactions of organic monomer compounds having functional groups which play and role of forming the required repetitive units by condensation. For example, such functional groups of these organic monomer compounds may include carboxyl, hydroxyl, ester and acyloxy groups, acid halides and amine group. The aforementioned organic monomer compounds may be reacted with each other by fusion acidolytic process, while keeping any heat exchange fluid out of existence. According to this method, first, fused solution of the reaction materials is formed by heating the monomers together. As the reactions are continued, solid polymer particles become being suspended in the liquid. For the purpose of facilitating removal of volatile matters (e.g., acetic acid or water) which are produced as by-products at the final stage of condensation, the system may be put under vacuum.

The slurry polymerization process may be employed for forming aromatic polyesters which are preferred for used in exercising this invention. By this method, the solid product is obtained in the state of being suspended in a heat exchange medium.

Whichever process, the aforementioned fusion acidolytic process or the slurry polymerization process, is employed, the organic monomer reaction materials which are to derive the aromatic polyesters may be put to use for the reactions in their denatured form (thus, as lower acyl esters) in which the hydroxyl groups of such monomers at normal temperature are esterified. As lower acyl groups, those with carbon atoms approx. 2–4 in number are preferable. Preferably, acetic acid esters of such organic monomer reaction materials are put to use for the reactions.

Further mentioned as typical examples of catalyzers which are arbitrarily usable either in the fusion acidolytic process or slurry process are: Gaseous acid catalyzers, etc., such as dialkyl tin oxide (e.g., dibutyl tin oxide), diallyl tin oxide, titanium dioxide, antimony trioxide, alkoxytitanium silicate, titanium alkoxide, alkali and alkaline earth metal salts of carboxylic acids (e.g., zinc acetate), Lewis acids (e.g., $BF_3$), hydrogen halides (e.g, HCl), etc. The amounts of catalyzers used generally should be approx. 0.001–1% by weight, particularly, approx. 0.01–0.2% by weight, based on the total weight of monomers.

The aromatic polymers suitable for use in exercising this invention show a tendency of being substantially insoluble in common solvents and therefore, they are not suitable for forming from solution. However, as already described, these polymers permit easy forming by the ordinary fusion forming process. Particularly desirable aromatic polymers are soluble in some degree in pentafluorophenol.

The aromatic polyesters preferable for use in exercising this invention generally should have weight average molecular weights of approx. 2,000–200,000, preferably, approx. 10,000–50,000 and more preferably, approx. 20,000–25,000. On the other hand the preferable aromatic poly(ester-amides) generally should have molecular weights of approx. 5,000–50,000, preferably, approx. 10,000–30,000, e.g., 15,000–17,000. Measurement of such molecular weights may be made by gel permeation chromatography and other standard measuring methods which do not accompany solution forming of polymer, for example, by determining terminal groups by infrared spectroscopy on compression molded films. Or the measurement of molecular weight may be made by light scattering method on solution of polymer in pentafluorophenol.

The aforementioned aromatic polyesters and polyester amides, when dissolved in pentafluorophenol at 60° C. at a concentration of 0.1 weight %, generally give inherent viscosity (I. V.) of at least approx. 2.0 dl/g, for example, approx. 2.0–10.0 dl/g.

The polyesters adapted to form anisotropic fused phase which are particularly desirable for use in exercising this invention should contain more than approx. 10 mol % of naphthalene part containing repetitive units such as 6-hydroxy-2-naphthoyl, 2,6-dioxynaphthalene and 2,6-dicarboxynaphthalene, etc. Desirable polyester amides should contain repetitive units of the aforementioned naphthalene part and another part comprising 4-aminophenol or 1,4-phenylene diamine.

Particular examples are given hereunder:

(1) Polyesters essentially composed of the following repetitive units I and II:

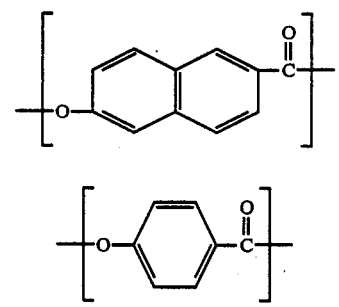

The polyesters contain approx. 10–90 mol % of unit I and approx. 10–90 mol % of unit II. In one mode, the units I exist up to approx. 65–85 mol %, preferably, approx. 70–80 mol % (e.g., about 75 mol %). In another mode, the units II exist at as far lower concentrations as approx. 15–35 mol %, preferably, approx. 20–30 mol %, and at least part of hydrogen atoms bonded to the ring(s) are allowed to be substituted, as the case may be, by any substituent radicals selected from among a group consisting of alkyl groups with number of carbon atoms 1–4, alkoxy groups with number of carbon atoms 1–4, halogens, phenyls, substituted phenyls and their combinations.

(2) Polyesters essentially composed of the following repetitive units, I, II and III:

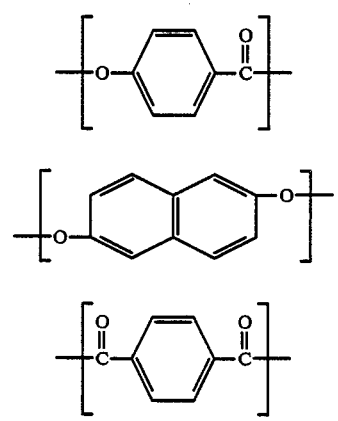

These polyesters contain approx. 30–70 mol % of unit I. They should preferably, contain approx. 40–60 mol % of unit I, approx. 20–30 mol % of units II and approx. 20–30 mol % of unit III and at least part of hydrogen atoms bonded to the ring(s) are allowed to be substituted, as the case may be, by any substituent radicals selected from among a group consisting of alkyl groups with the number of carbons 1–4, alkoxy groups with the number of carbons 1-4, halogens, phenyls, substituted phenyls and their combinations.

(3) Polyesters essentially composed of the following repetitive units I, II, III and IV:

I

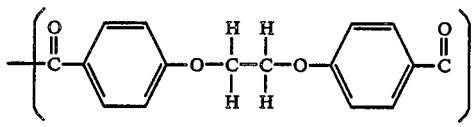
II

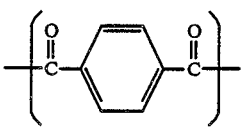
III

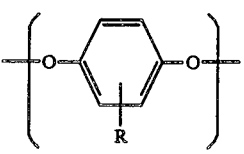
IV (where R means methyl, chloro, bromo or their combinations, being substituent radicals to hydrogen atoms on benzene ring(s).) They contain approx. 20-60 mol % of unit I, approx. 5-18 mol % of unit II, approx. 5-35 mol % of unit III and approx. 20-40 mil % of unit IV. These polyesters should preferably contain approx. 35-45 mol % of unit I, approx. 10-15 mol % of unit II, approx. 15-25 mol % of unit III and approx. 25-35 mol % of unit IV. Provided that sum total mol concentration of units II and III is substantially equal to the mol concentration of units IV. At least part of the hydrogen atoms which are bonded to the ring(s) are allowed to be substituted, as the case may be, by any substituent radical(s) selected from among a group consisting of alkyl radicals with the number of carbon atoms 1-4, alkoxy radicals with the number of carbon atoms 1-4, halogens, phenyls, substituted phenyls and their combinations. These aromatic polyesters, when dissolved at 60° C. in pentafluorophenol at a concentration of 0.3 W/V %, generally give their inherent viscosities at least 2.0 dl/g, e.g., 2.0-10.0 dl/g.

(4) Polyesters essentially composed of the following repetitive units I, II, III and IV:

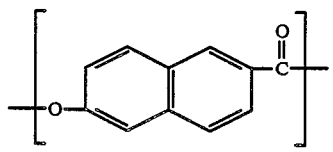
I

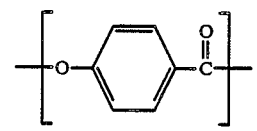
II

III. dioxyaryl unit represented by a general formula:
-(O—Ar—O)-(where Ar means a divalent group having at least one benzene ring.)

IV. dioxyaryl unit represented by a general formula

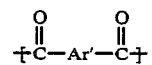

(where Ar' means a divalent group having at least one benzene ring)

They contain approx. 20-40 mol % of unit I, more than 10 mol % but less than approx. 50 mol % of unit II, more than 5 mol % but less than approx. 30 mol % of unit III and more than 5 mol % but less than approx. 30 mol % of unit IV. These polyesters should preferably contain approx. 20-30 mol % (e.g., approx. 25 mol %) of unit I, approx. 25-40 mol % (e.g., approx. 35 mol %) of unit II, approx. 15-25 mol % (e.g., approx. 20 mol %) of unit III and approx. 15-25 mol % (e.g., approx. 20 mol %) of unit IV. And at least part of hydrogen atoms bonded to the ring(s) are allowed to be substituted by any substituent radicals selected from among a group consisting of alkyl radicals with the number of carbon atoms 1-4, alkoxy radicals with the number of carbon atoms 1-4, halogens, phenyls, substituted phenyls and their combinations.

The units III and IV should preferably be symmetric in the sense that the divalent bonds which are joining each one of them to other units on both sides thereof inside the polymer main chain are symmetrically arranged on 1 or 2 or more of benzene rings (for example, when they exist on a naphthalene ring, they are arranged mutually at para positions or at diagonal ring positions). However, non-symmetrical units which may be derived from resorcinol and isophthalic acid are also usable.

Desirable dioxyaryl unit III is:

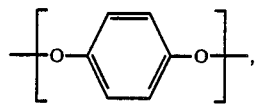

and desirable dioxyaryl unit is:

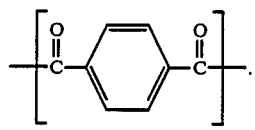

(5) Polyesters essentially composed of the following repetitive units I, II and III:

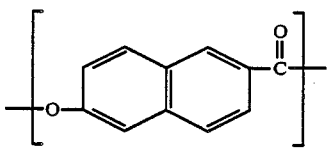
I

II. dioxyaryl unit represented by a general formula -(O—Ar—O)-(where Ar means a divalent radical having at least one benzene ring)

III. Dicarboxylaryl unit represented by a general formula

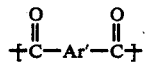

(where Ar' means a divalent radical containing at least one benzene ring)

They contain approx. 10–90 mol % of unit I, 5–45 mol % of unit II and 5–45 mol % of unit III. These polyesters should preferably contain approx. 20–80 mol % unit I, approx. 10–40 mol % of the unit II and approx. 10–40 mil % of the unit III. More preferably, they should contain approx. 60–80 mol % of unit I, approx. 10–20 mol % of unit II and approx. 10–20 mol % of unit III. And at least part of hydrogen atoms bonded to the ring(s) are allowed to be substituted, as the case may be, by any substituent radical(s) selected from among a group consisting of alkyl radicals with the number of carbon atoms 1–4, alkoxyl radicals with the number of carbon atoms 1–4, halogens, phenyls, substituted phenyls and their combinations.

Desirable dioxyallyl unit II should be:

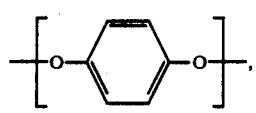

and desirable dicarboxyaryl unit III should be:

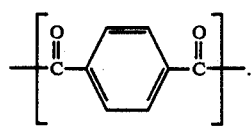

(6) Polyester amides essentially composed of the following repetitive units I, II, III and IV:

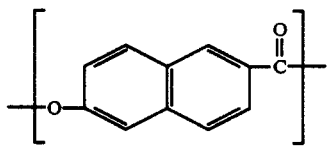

II. A general formula

(where A means a divalent radical having at least one benzene ring or divalent trans-cyclohexane radical)

III. A general formula Y—Ar—Z (where Ar means a divalent radical having at least one benzene ring; Y represents O, NH or NR; and Z stands for NH or NR; where R means alkyl radicals or aryl radicals with the number of carbon atoms 1–6)

IV. A general formula O—Ar'—O (where Ar' means a divalent radical having at least one benzene ring)

They contain approx. 10–90 mol % of unit I, approx. 5–45 mol % of unit II, approx. 5–45 mol % of unit III and approx. 0–40 mol % of unit IV. And at least part of hydrogen atoms bonded to the ring(s) are allowed to be substituted, as the case may be, by any substituent radicals selected from among a group consisting of alkyl radicals with the number of carbon atoms 1–4, alkoxy radicals with the number of carbon atoms 1–4, halogens, phenyls, substituted phenyls and their combinations.

Desirable dicarboxyaryl unit II should be

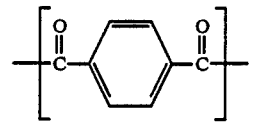

desirable unit III should be

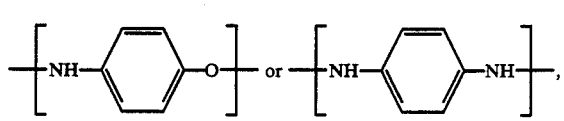

and desirable dioxyaryl unit IV should be

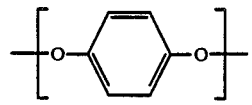

Further, in the polymers adapted to form anisotropic melt phase of this invention, polymers in which part of their high molecular chain is composed of a segment of a polymer adapted to form anisotropic melt phase hereabove-described and the remaining part is composed of a segment of a thermoplastic resin not adapted to form anisotropic melt phase may be included.

The polymer composition of this invention adapted to form anisotropic melt phase and which is melt-processable may contain one or more of (1) other polymers adapted to form anisotropic melt phase, (2) thermoplastic resins not adapted to form anisotropic melt phase, (3) thermosetting resins, (4) low molecular organic compounds, (5) inorganic substances. The polymer segment adapted to form anisotropic melt phase and the remaining segment are allowed to be either thermodynamically compatible or not.

Included as the thermoplastic resins hereabove mentioned in (2) are: e.g., polyethylene, polypropylene, polybutylene, polybutadiene, polyisoprene, polyvinyl acetate, polyvinyl chloride, polyvinylidene chloride, polystyrene, acrylic resins, ABS resin, AS resin, BS resin, polyurethane, silicone resin, fluorine series resins, polyacetals, polycarbonates, polyethylene terephthalate, aromatic polyesters, polyamides, polyacrilonitrile, polyvinyl alcohol, polyvinyl ether, polyetherimide, polyamideimide, polyether etherimide, polyether ether ketones, polyether sulfones, polyphenylene sulfide, polyphenylene oxide, etc.

Included as the thermosetting resins mentioned hereabove in (3): e.g., phenol resins, epoxy resins, melamine resin, urea resins, unsaturated polyester resins, alkyd resins, etc.

Included as the low molecular organic compounds mentioned hereabove in (4) are: for example, substances which are to be added to general thermoplastic resins and thermosetting resins, which thus, include low molecular organic compounds used as plasticizers, light- and weather-proofing stabilizers like antioxidants or ultraviolet ray absorbers, etc., antistatic agents, fire retardants, coloring agents like dyes, pigments, etc., blowing agents, further, divinyl series compounds, bridging agents like peroxides or vulcanizing agents, etc., and lubricants for improving fluidity and mold releasing property, etc.

Further included as the inorganic substances mentioned hereabove in (5) are: e.g., materials to be added to general thermoplastic resins and thermosetting resins, which thus, include general inorganic fibers such as glass fibers, carbon fibers, metal fibers, ceramic fibers, boron fibers, asbestos, etc., powdery materials such as calcium carbonate, highly dispersible silicic acid, alumina, aluminum hydroxide, talc powder, mica, glass flake, glass beads, quartz powder, silica sand, various metal powders, carbon black, barium sulfate, calcined plaster, etc., inorganic compounds such as silicon carbide, alumina, boron nitride, silicon nitride, etc., and whiskers and metal whiskers, etc.

1 ... Substrate
2 ... Data pits
3 ... Reflection
4 ... Transparent resin

Figure 1:
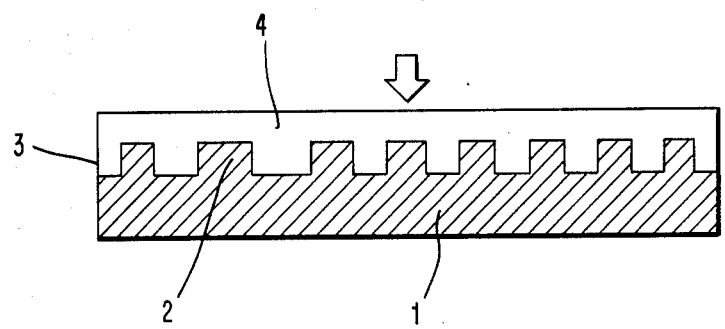
FIG. 1 is a schematic sectional view illustrating the photo-disc of this invention.

In the following, as briefly describing the manufacturing method of the photo-disc of this invention, first, according to the ordinary method, a conductive film is formed on a photo-resist surface of a glass substrate by vapor-deposition of nonelectrolytic plating process; thereafter, the work is subjected to electrocasting of nickel and a master board, mother board and a matrix (stamper) for mass reproduction are fabricated. Then using this stamper as the matrix, the polymer composition of this invention adapted to form anisotropic melt phase and which is melt-processable is extruded and by way of injection molding, compression molding, etc., the disc substrate 1 as shown in FIG. 1 is formed and grooves 2 as data pits are formed in relief simultaneously therewith. Then a metal coating layer 3 is formed on the surface formed with the data pits 2. The type of metal of the metal coating layer 3 is not particularly limited, but the commonest ones are aluminum, chromium, gold, silver, copper, tin, etc., and for the method of forming the coating layer, vapor-deposition, spattering, ion-plating and all other methods which have heretofore been known may be employed. Its thickness is not subject to particular limitation so far as the aforementioned reflectivity can be effectively exhibited, but the most typical range where requirements in both phases of characteristics and economy of said coating layer are met is about 500–1,500Å, preferably about 700–800Å.

In the photo-disc of this invention, on the surface of the metal coating layer 3, a light transmitting layer doubled as a protective layer 4 is further provided. Because the polymer used according to this invention adapted to form anisotropic melt phase, which is used in exercising this invention, is opaque, the laser beam irradiation is not made from the substrate side, but, as shown by an arrow mark in FIG. 1, the laser beam is irradiated on the metal coating layer from the opposite side thereto. It is for this reason that the surface protecting layer 4 for the metal coating layer 3 needs to be formed of a transparent resin so that it can play the role of light transmitting layer. As such transparent resins, acrylic ultraviolet ray setting resins, methacrylic resins, urethane resins, silicone resins, epoxy resins, etc. may be mentioned.

Figure 2:
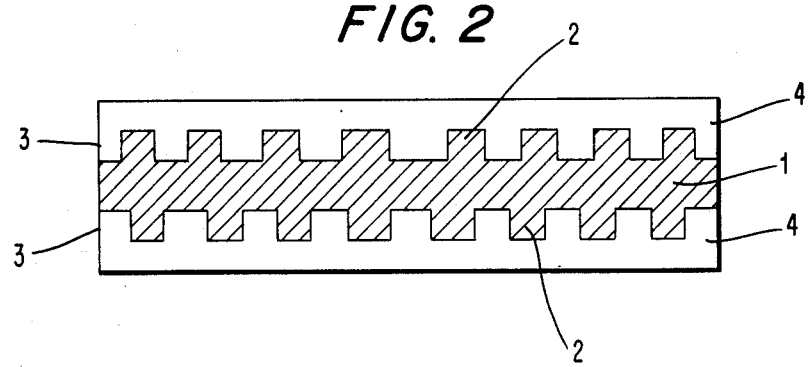
FIG. 2 is a schematic sectional view showing another example.

While in the aforementioned example, a sheet of disc substrate 1 is so arranged that the recorded data may be reproduced from one side surface only, if, as shown in FIG. 2, two such sheets are put together with an adhesive such that they face each other on the side on which no metal coating layer is provided, then, both front and back surfaces may be utilized as the record reproducing surfaces.

Effects of the present invention which is roughly composed as hereabove described are summarized as follows:

(1) The compositions of this invention have higher dimensional stability than acrylic resins, polycarbonates, etc., under ambient circumstances involving moisture, heat, etc.

(2) They give smaller percentage of molding shrinkage and higher accuracy in shape and dimensions, when subjected to extrusion molding, than acrylic resins, polycarbonates, etc.

(3) They, having excellent formability, can truely reproduced fine and dense undulations of a stamper and give high accuracy in recording and reproduction of data.

EXAMPLE 1

With a photo-disc stamper inserted in a mold, a polymer A adapted to form anisotropic melt phase, which is later-described, was injection-molded at 300° C. cylinder temperature, 200 kg/cm$^2$ injection pressure and 80° C. mold temperature, yielding a photo-disc substrate (1) 120 mm in diameter and 1.2 mm thick. On the data pit (2) surface side of this disc substrate, approx. 500 Å aluminum film (3) was vapor-deposited, on which an ultraviolet ray setting acrylic resin was coated, followed by ultraviolet-ray-setting, thereby forming a surface protective layer (4) approx. 10 μm thick. The photo-disc thus obtained was left standing for 48 hours at a temperature and humidity of 40° C. and 90% RH to examine whether the disc showed any deformation and warp. Under the similar molding conditions, a test piece was formed and with it, impact strength (ASTM D-256), coefficient of linear expansion (ASTM D-696) and percentage of molding shrinkage were measured.

EXAMPLE 2–3

Experiments were carried out similarly as in Example 1 except that the resin with which to form the disc substrate was altered respectively to polymers B and C adapted to form anisotropic melt phase, which are described later.

COMPARISON EXAMPLE 1

From polymethacrylate resin for photo-disc, a disc substrate was injection-molded by the similar method as in Example 1 (cylinder temperature: 260° C., injection pressure: 50 kg/cm$^2$, mold temperature: 70° C.). Then with the metal coating and the surface protective layer formed on this disc substrate similarly as in Example 1, similar tests were conducted.

COMPARISON EXAMPLE 2

From a polycarbonate resin for photo-disc, a disc substrate was injection-molded by the similar method as that of Example 1 (cylinder temperature 290° C., injection pressure 80 kg/cm², mold temperature 80° C.).

Then experiments were conducted similarly as in Comparison Example 1.

Results of experiments of Examples and Comparison Examples are summarily put up in Table 1.

It should be noted that polymers A, B and C adapted to form anisotropic melt phase, which were used as resins for forming substrates, have the following construction units:

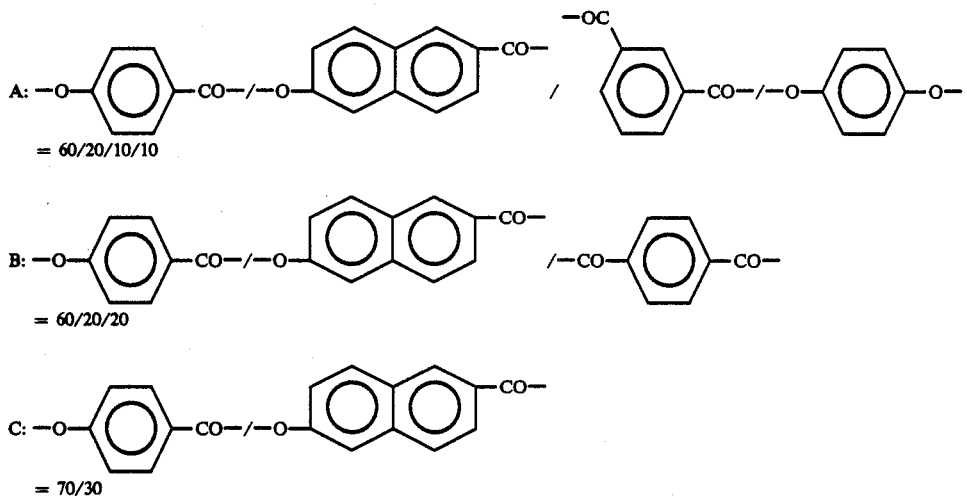

Particular manufacturing methods of the aforementioned resins A, B and C are described hereunder:

Resin A

1081 Parts by weight of 4-acetoxy-benzoic acid, 460 parts by weight of 6-acetoxy-2-naphthoic acid, 166 parts by weight of isophthalic acid and 194 parts by weight of diacetoxybenzene were charged into a reaction vessel equipped with a stirrer, nitrogen inlet pipe and distillate discharge pipe and the mixture was heated to 260° C. in nitrogen current. It is, then, violently stirred for 2.5 hours at 260° C. and then, for 3 hours at 280° C., while letting acetic acid be distilling out of the reaction vessel. Further, its temperature was raised to 320° C. and the letting-in of nitrogen was stopped; thereafter, the pressure inside the reaction vessel was gradually lowered, the pressure being brought down to 0.1 mmHg 15 minutes later, followed by stirring for 1 hour at this temperature and pressure.

The polymer thus obtained had an distilled viscosity of 5.0, as measured in pentafluorophenol at 0.1% by weight concentration and at 60° C.

Resin B

1081 Parts by weight of 4-acetoxybenzoic acid, 489 parts by weight of 2,6-diacetoxynaphthalene and 332 parts by weight of terephthalic acid were put into a reaction vessel equipped with a stirrer, nitrogen inlet pipe and distillate discharge pipe and this mixture was heated to 250° C. in nitrogen current. Then it was violently stirred for 2 hours at 250° C. and then, for 2.5 hours at 280° C., while letting acetic acid be distilled out of the reaction vessel. Further, its temperature was raised to 320° C. and the letting-in of nitrogen was stopped; thereafter, the pressure inside the reaction vessel was gradually lowered, the pressure being reduced to 0.2 mmHg 30 minutes later, followed by stirring for 1.5 hours at this temperature and pressure.

The polymer thus obtained had its inherent viscosity of 2.5, as measured in pentafluorophenol at 0.1% by weight concentration and at 60° C.

Resin C

1261 Parts by weight of 4-acetoxybenzoic acid and 691 parts by weight of 6-acetoxy-2-naphthoic acid were put into a reaction vessel equipped with a nitrogen inlet pipe and distillate discharge pipe and this mixture was heated to 250° C. in nitrogen current. It was violently stirred for 3 hours at 250° C. and then, for 2 hours at 280° C., while letting acetic acid be distilled out of the reaction vessel. Further, its temperature was raised to 320° C. and the letting-in of nitrogen was stopped; thereafter, the pressure inside the reaction vessel was lowered, the pressure being reduced to 0.1 mmHg 20 minutes later, followed by stirring for 1 hour at this temperature and pressure.

The polymer thus obtained had its inherent viscosity of 5.4, as measured in pentafluorophenol at 0.1% by weight concentration and 60° C.

TABLE 1

| | Physical property | | | |
| Example | Deformation and warp | Impact strength (Notched bar) (kg · cm/cm) | Coefficient of linear expansion ($\times 10^{-5}$ (cm/cm/°C.) | Percentage of mold shrinkage (%) |
| --- | --- | --- | --- | --- |
| Example 1 | Not found | 40 | 0.1 | 0.2 |
| Example 2 | Not found | 45 | 0.2 | 0.3 |
| Example 3 | Not found | 46 | 0.1 | 0.2 |
| Comparison Example 1 | Found | 2.0 | 6 | 0.7 |
| Comparison | Found | 38 | 7 | 0.6 |

TABLE 1-continued

| | Physical property | | | |
|---|---|---|---|---|
| Example | Deformation and warp | Impact strength (Notched bar) (kg·cm/cm) | Coefficient of linear expansion ($\times 10^{-5}$ (cm/cm/°C.)) | Percentage of mold shrinkage (%) |
| Example 2 | | | | |

The embodiments of the invention in which an exclusive property or privilege is claimed are defined as follows:

1. An optical disc which comprises a substrate comprising a melt-processable polymer which is capable of forming an anisotropic melt phase, a recording layer having pits and grooves formed on said substrate, and a metal coating layer formed on said recording layer.

2. An optical disc as claimed in claim 1, which further comprises a light-transmitting, surface-protecting layer on the metal coating layer.

3. An optical disc as claimed in claim 2, in which the light-transmitting, surface-protecting layer has been formed of a transparent resin.

4. An optical disc as claimed in claim 1 or 2, in which the recording layer has been placed only on one side of the substrate.

5. An optical disc as claimed in claim 1 or 2, in which the recording layer has been provided on each side of the substrate.

6. An optical disc which has been obtained by assembling two optical discs as defined in claim 1 or 2 by attaching them to each other on the rear surfaces of the substrates.

7. An optical disc as claimed in claim 1, in which the substrate is of a polymer composition comprising said polymer and another polymer.

8. An optical disc as claimed in claim 1 wherein said melt-processable polymer which is capable of forming an anisotropic melt phase of said substrate contains more than approximately 10 mol percent of naphthalene units.

9. An optical disc as claimed in claim 8 wherein said naphthalene units of said melt-processable polymer which is capable of forming an anisotropic melt phase of said substrate are selected form the group consisting of 6-hydroxy-2-naphthoyl, 2,6-dioxynaphthalene, and 2,6-dicarboxynaphthalene.

10. An optical disc as claimed in claim 1 wherein said melt-processable polymer which is capable of forming an anisotropic melt phase of said substrate exhibits an inherent viscosity of at least 2.0 dl./g. when dissolved in a concentration of 0.1 percent by weight in pentafluorophenol at 60° C.

11. An optical disc as claimed in claim 1 wherein said melt-processable polymer which is capable of forming an anisotropic melt phase of said substrate exhibits an inherent viscosity of approximately 2.0 to 10.0 dl./g. when dissolved in a concentration of 0.1 percent weight in pentafluorophenol at 60° C.

12. An optical disc as claimed in claim 1 wherein said melt-processable polymer which is capable of forming an anisotropic melt phase of said substrate is a polyester which consist essentially of the recurring moieties I and II which may include substitution of at least some of the hydrogen atoms present upon an aromatic ring wherein:

I is

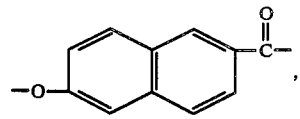

and
II is

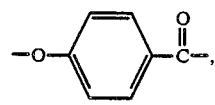

with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises approximately 10 to 90 mol percent of moiety I, and approximately 10 to 90 mol percent of moiety II.

13. An optical disc as claimed in claim 1 wherein said melt-processable polymer which is capable of forming an anisotropic melt phase of said substrate is a polyester which consists essentially of recurring moieties I, II and III where:

I is

II is

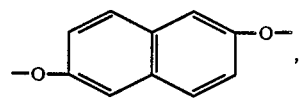

and
III is

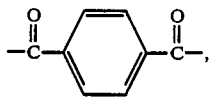

with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 30 to 70 mol percent of moiety I.

14. An optical disc as claimed in claim 13 wherein moiety I is present in a concentration of about 40 to 60 mol percent, moiety II is present in a concentration of about 20 to 30 mol percent, and moiety III is present in a concentration of about 20 to 30 mol percent.

15. An optical disc as claimed in claim 1 wherein said melt-processable polymer which is capable of forming an anisotropic melt phase of said substrate is a polyester which consists essentially of the recurring moieties I, II, III and IV wherein:

I is

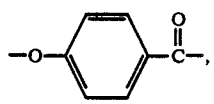

II is

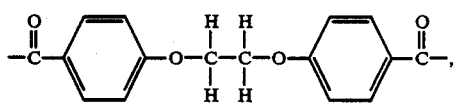

III is

and
IV is

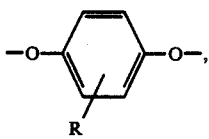

where R is methyl, chloro, bromo, and mixtures thereof, and is substituted for a hydrogen atom present upon the aromatic ring, and wherein the polyester comprises about 20 to 60 mol percent of moiety I, about 5 to 18 mol percent of moiety II, about 5 to 35 mol percent of moiety III, and about 20 to 40 mol percent of moiety IV.

16. An optical disc as claimed in claim 15 wherein moiety I is present in a concentration of about 35 to 45 mol percent, moiety II is present in a concentration of about 10 to 15 mol percent, moiety III is present in a concentration of about 15 to 25 mol percent, and moiety IV is present in a concentration of about 25 to 35 mol percent.

17. An optical disc as claimed in claim 1 wherein said melt-processable polymer which is capable of forming an anisotropic melt phase of said substrate is a polyester which consists essentially of moieties I, II, III and IV which may include substitution of at least some of the hydrogen atoms present upon an aromatic ring wherein:

I is

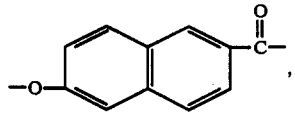

II is

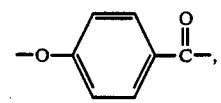

III is a dioxyaryl moiety of the formula —O—Ar—O— where Ar is a divalent radical comprising at least one aromatic ring, and IV is a dicarboxyaryl moiety of the formula

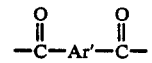

where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 20 to 40 mol percent of moiety I, in excess of 10 mol percent but less than about 50 mol percent of moiety II, in excess of 5 mol percent but less than about 30 mol percent of moiety III, and in excess of 5 mol percent but less than 30 mol percent of moiety IV.

18. An optical disc as claimed in claim 17 wherein moiety I is present in a concentration of about 20 to 30 mol percent, Moiety II is present in a concentration of about 25 to 40 mol percent, moiety III is present in a concentration of about 15 to 25 mol percent, and moiety IV is present in a concentration of about 15 to 25 mol percent.

19. An optical disc as claimed in claim 1 wherein said melt-processable polymer which is capable of forming an anisotropic melt phase of said substrate is a polyester which consists essentially of recurring moieties I, II, and III which may include substitution of at least some of the hydrogen atoms present upon an aromatic ring wherein:

I is

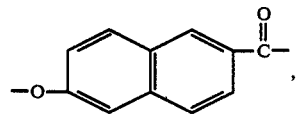

II is a dioxyaryl moiety of the formula —O—Ar—O— where Ar is a divalent radical comprising at least one aromatic ring, and III is a dicarboxyaryl moiety of the formula

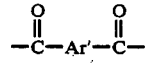

where Ar' is a divalent radical comprising at least one aromatic ring, with said optional substitution if present being selected form the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 10 to 90 mol percent of moiety I, about 5 to 45 mol percent of moiety II, and about 5 to 45 mol percent of moiety III.

20. An optical disc as claimed in claim 19 wherein moiety I is present in a concentration of about 20 to 80 mol percent, moiety II is present in a concentration of about 10 to 40 mol percent, and moiety III is present in a concentration of about 10 to 40 mol percent.

21. An optical disc as claimed in claim 1 wherein said melt-processable polymer which is capable of forming an anisotropic melt phase of said substrate is a poly(ester-amide) which consists essentially of recurring moieties I, II, and III, and optionally IV, wherein:

I is

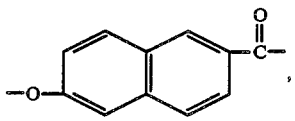

II is

where A is a divalent radical comprising at least one aromatic ring or a divalent transcyclohexane radical, III is —Y—Ar—Z— where Ar is a divalent radical comprising at least one aromatic ring, Y is O, NH, or NR, and Z is NH or NR, where R is an alkyl group having 1 to 6 carbon atoms or an aryl group, and IV is —O—Ar'—O— where Ar' is a divalent radical comprising at least one aromatic ring, with said optional substitution if present being selected from the group consisting of an alkyl group of 1 to 4 carbon atoms, and alkoxy group of 1 to 4 carbon atoms, halogen, phenyl, substituted phenyl, and mixtures of the foregoing, and wherein said poly(ester-amide) comprises about 10 to 90 mol percent of moiety I, about 5 to 45 mol percent of moiety II, about 5 to 45 mol percent of moiety IV.

22. An optical disc as claimed in claim 21 wherein moiety II is

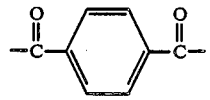

and moiety III is

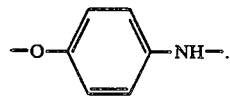

* * * * *